US012235525B2

(12) United States Patent
Shan et al.

(10) Patent No.: US 12,235,525 B2
(45) Date of Patent: Feb. 25, 2025

(54) POLARIZED LENSES COMPRISING MIX OF NIR DYES FOR BROAD NIR PROTECTION

(71) Applicant: Essilor International, Charenton-le-pont (FR)

(72) Inventors: Haifeng Shan, Dallas, TX (US); Hao-Wen Chiu, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 644 days.

(21) Appl. No.: 17/442,494

(22) PCT Filed: Mar. 23, 2020

(86) PCT No.: PCT/EP2020/057974
§ 371 (c)(1),
(2) Date: Sep. 23, 2021

(87) PCT Pub. No.: WO2020/193472
PCT Pub. Date: Oct. 1, 2020

(65) Prior Publication Data
US 2022/0171216 A1    Jun. 2, 2022

(30) Foreign Application Priority Data
Mar. 25, 2019 (EP) .................................... 19305372

(51) Int. Cl.
*G02C 7/10*    (2006.01)
*C08K 5/00*    (2006.01)
(Continued)

(52) U.S. Cl.
CPC ............ *G02C 7/104* (2013.01); *C08K 5/0041* (2013.01); *G02B 1/041* (2013.01); *G02C 7/12* (2013.01)

(58) Field of Classification Search
CPC .......... G02C 7/104; G02C 7/12; G02C 7/102; G02C 7/108; C08K 5/0041; G02B 1/041;
(Continued)

(56) References Cited

U.S. PATENT DOCUMENTS

| 2007/0090331 A1 | 4/2007 | Seo |
| 2012/0243077 A1 | 9/2012 | Osawa et al. |

(Continued)

FOREIGN PATENT DOCUMENTS

| DE | 19942396 | 3/2001 |
| EP | 1602700 | 12/2005 |

(Continued)

OTHER PUBLICATIONS

European Office Action in corresponding European Application No. 19305372.5, dated Nov. 10, 2022.
(Continued)

*Primary Examiner* — Tuyen Tra
(74) *Attorney, Agent, or Firm* — Norton Rose Fulbright US LLP

(57) ABSTRACT

Disclosed are optical elements and the methods of producing the same. The optical element contains two or more near infrared absorbers mixed in an optical substrate, and one or more functional film disposed on the optical substrate. The method of producing the optical element comprises mixing two near infrared absorbers with different near infrared wavelengths absorption ranges and residual colors with a precursor of an optical substrate. The mixture is subsequently processed to produce an optical element that has broad near infrared wavelength absorption range, a high near infrared absorption level, and/or homogeneous color distribution.

10 Claims, 12 Drawing Sheets

(51) Int. Cl.
*G02B 1/04* (2006.01)
*G02C 7/12* (2006.01)
(58) Field of Classification Search
CPC .......... G02B 1/08; G02B 5/206; G02B 5/208; G02B 5/223
See application file for complete search history.

(56) References Cited

U.S. PATENT DOCUMENTS

| | | |
|---|---|---|
| 2018/0201718 A1 | 7/2018 | Kim et al. |
| 2022/0171216 A1 | 6/2022 | Shan |

FOREIGN PATENT DOCUMENTS

| | | |
|---|---|---|
| EP | 1876212 | 1/2008 |
| EP | 2138887 | 12/2009 |
| EP | 2402794 | 1/2012 |
| EP | 2768895 | 8/2014 |
| EP | 3296352 | 3/2018 |
| EP | 3296775 | 3/2018 |
| EP | 3318920 | 5/2018 |
| EP | 3407119 B1 | 11/2018 |
| JP | 2009185161 | 8/2009 |
| JP | 2011164583 | 8/2011 |
| JP | 2011-237625 | 11/2011 |
| JP | 2017-529415 | 10/2017 |
| JP | 2018-529829 | 10/2018 |

OTHER PUBLICATIONS

International Search Report & Written Opinion issued in priority application No. PCT/EP2020/057974, dated Mar. 25, 2019.
International Search Report & Written Opinion issued in related application No. PCT/EP2020/057975, dated Mar. 25, 2019.

POLARIZED LENSES COMPRISING MIX OF NIR DYES FOR BROAD NIR PROTECTION

CROSS-REFERENCE TO RELATED APPLICATIONS

This application is a national phase application under 35 U.S.C. § 371 of International Application No. PCT/EP2020/057974 filed 23 Mar. 2020, which claims priority to European Patent Application No. 19305372.5 filed 25 Mar. 2019. The entire contents of each of the above-referenced disclosures is specifically incorporated by reference herein without disclaimer.

FIELD OF INVENTION

The present invention concerns an optical element and a method of making the same. More specifically, the present invention concerns an optical element that contains multiple near-infrared absorbers mixed in an optical substrate and a functional film disposed on the optical substrate.

BACKGROUND OF THE INVENTION

Infrared (IR) radiation is electromagnetic radiation with longer wavelengths than visible light. Infrared radiation generally has wavelengths in a range of 780 nm to 1 mm, which can be divided into three sub-regions including: near infrared (NIR) range, with wavelengths of 780 to 3000 nm; mid infrared (MIR) range, with wavelengths of 3 μm to 50 μm; and far infrared (FIR) range, with wavelengths of 50 to 1000 μm.

Extensive studies have been conducted to evaluate of impact of NIR radiation on the eyes. The results of the studies have shown that NIR is absorbed by retinal pigment epithelium. Depending on fluence rate, total dose, and spectral characteristics of the NIR, it can cause structural retinal damage via at least one of photomechanical (photoacoustic) process, photothermal (heating) process, and photochemical process. Furthermore, many research results have indicated a strong correlation between chronic NIR exposure and occurrence of cataract in the eyes. Thus, it is desirable to limit exposure of eyes to NIR radiation.

Optical filtering means are generally incorporated in optical articles (e.g., sunglasses lens materials) to reduce or prevent NIR light from reaching the retina. More specifically, two types of NIR filters, including NIR absorbing filters and interferential filters (e.g., reflective filters), can be used on optical lenses to provide protection for eyes against NIR radiation. However, designing a multifunctional filter with optimized NIR absorption performance along with other functions, including antireflective function, is challenging, as high NIR absorption is proved to be detrimental to antireflective performances of optical filters. An NIR absorber can be incorporated into optical coating(s) that is deposited on optical articles. However, direct incorporation of a NIR absorber in an optical coating can significantly increase the production cost of the lens and, at the same time, degrade the mechanical properties of the optical coating.

Another option for improving NIR protection can include incorporating an NIR absorber into the bulk substrate of an optical article by impregnation of the substrate or mixing a substrate precursor with a NIR absorber. However, most commercial NIR absorbers are not thermally stable under conditions for lens production processes. For instance, polarized lenses are generally produced via injection molding with a polarizing wafer disposed on the front surface of the lens. The temperature during injection molding can reach above 300° C., at which many commercial NIR absorbers decompose, resulting in loss of NIR protection for the produced lenses. Furthermore, commercially available NIR absorber mixed in lens substrate can significantly reduce the light transmittance of the produced lenses, resulting in the produced lens not meeting the standards for transmission classifications. Additionally, commercial NIR absorbers generally have residual colors, which can alter the color appearance of the lens.

Overall, while optical lenses or other optical elements with the function of NIR protection exist, the need for improvements in this field persists in light of at least the aforementioned drawbacks for these optical lenses or optical elements.

SUMMARY OF THE INVENTION

A solution to the above-mentioned problems associated with optical elements with near infrared (NIR) protection has been discovered. The solution resides in an optical element comprising an optical substrate with one or more functional films disposed on the front surface and two or more near infrared absorbers mixed in the optical substrate. The near infrared absorbers can be substantially homogenously mixed in the optical substrate. The two or more near infrared absorbers in the optical element may have different near infrared ranges such that the optical article is capable of absorbing near infrared radiation in a broader wavelength range compared to conventional NIR protective optical articles. Furthermore, the two or more near infrared absorbers in the optical elements may have different residual colors such that the synergistic residual color intensity is minimized, avoiding alteration of the color appearance of the optical elements caused by NIR absorbers. Additionally, the NIR absorbers in the optical elements are adapted to minimize the synergistic reduction of light transmittance caused by the NIR absorbers and to withstand the production conditions of the optical elements without decomposition. Therefore, the optical elements of the present invention provide a technical solution to at least some of the problems associated with the conventional NIR protective optical elements.

Some embodiments of the present invention are directed to an optical element. In some aspects, the optical element may comprise an optical substrate comprising a front surface and a back surface. The optical element may comprise two or more near infrared absorbers substantially homogeneously mixed in the optical substrate. In some aspects, the optical element may comprise one or more functional films disposed on the front surface and/or back surface of the optical substrate. In some aspects, the two or more near infrared absorbers may have different near infrared cut ranges and/or different residual colors.

Some embodiments of the present invention are directed to a method of preparing an optical element. In some aspects, the method may comprise providing a precursor material for the optical substrate and two or more of the near infrared absorbers. In some aspects, the method may comprise determining a concentration for each of the two or more of the near infrared absorbers, at which the two or more near infrared absorbers synergistically generates an infrared cut range that is broader than individual infrared cut range of each of the two or more near infrared absorbers and/or an infrared absorption level that is higher than individual infrared absorption range of each of the two or more near infrared absorbers. In some aspects, the method may comprise mixing the precursor material and the two or more of the near infrared absorbers at the determined concentrations to form a substantially homogenous mixture. In some aspects, the method may comprise producing the optical element that comprises the optical substrate and the functional film disposed on the front surface and/or back surface thereof by using the mixture.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DESCRIPTION OF THE DRAWINGS

For a more complete understanding, reference is now made to the following descriptions taken in conjunction with the accompanying drawings, in which:

FIG. 6A is a picture of lenses of −7.00 power with a center thickness of 1.3 mm; FIG. 6B is a picture of lenses of +4.00 power with a center thickness of 6.5 mm.

DETAILED DESCRIPTION OF THE INVENTION

Figure 1:
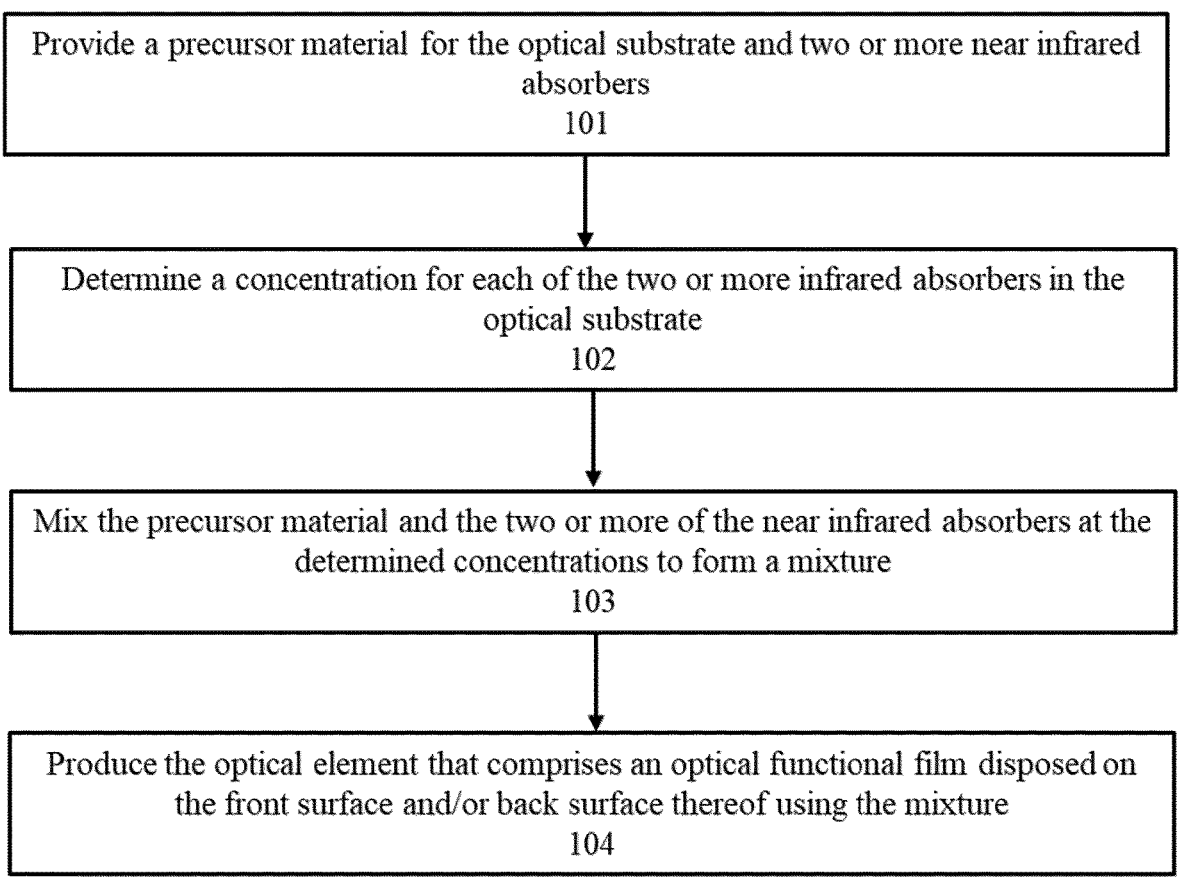
FIG. 1 shows a schematic flowchart for a method of producing an optical element containing a functional film and two or more near infrared absorbers, according to disclosed embodiments.

The currently available optical articles with NIR protection function suffer the deficiencies including decomposition of near infrared absorbers during the production process, alteration of color appearance caused by near infrared absorbers, and insufficient NIR absorption wavelengths range. The present invention provides a solution to at least some of these problems. The solution is premised on an optical element that includes two or more NIR absorbers mixed in an optical substrate. The two or more near infrared absorbers may have different NIR absorption ranges such that the optical element has a broader NIR absorption range than each of the near infrared absorbers. Additionally, the two or more near infrared absorbers can have different residual colors such that the near infrared absorbers synergistically have a neutral residual color, resulting in minimized color alternation of the optical articles caused by NIR absorbers. Moreover, the NIR absorbers mixed in the optical substrate is thermally stable under production conditions for the optical articles, avoiding decomposition of NIR absorbers during high temperature processes such as injection molding.

These and other non-limiting aspects of the present invention are discussed in further detail in the following sections.

A. Optical Element with Near Infrared Protection

Near infrared radiation has been proved to cause damage in the eyes. Optical elements, such as ophthalmic lenses, can incorporate near infrared protection function to protect users' eyes. However, conventionally, a near infrared absorber is generally incorporated in an optical filter, which requires further processes to be applied on the optical element, or in an optical coating, which can be negatively affected in terms of mechanical strength by the near infrared absorber. A near infrared absorber can be incorporated in the optical substrate. However, many commercial near infrared absorbers are not thermally stable under production conditions for optical articles, limiting the production processes that can be used for optical article production. The near infrared absorber in the optical article can also cause the alteration of the color of the optical article, which can negatively impact the aesthetic appearance of the optical article.

The optical element disclosed herein is thermally stable at high process temperatures for lens production processes, including injection molding. The optical element is capable of expanding the near infrared wavelengths cut range of an optical element and minimizing the residual colors of near infrared absorbers by incorporating, in the optical substrate of the optical element, two or more near infrared absorbers having different absorption ranges and/or different residual colors. Some embodiments include an optical element. In some instances, the optical element can be an ophthalmic lens. The ophthalmic lens can include a sunglasses lens or a substantially colorless transparent lens.

In embodiments of the invention, the optical element can include an optical substrate that comprise a front surface and a back surface. In some aspects, the front surface of the optical substrate may comprise a convex surface of an ophthalmic lens. In some aspects, the back surface of the optical substrate may comprise a concave surface of an ophthalmic lens. Non limiting examples of the optical substrate include polycarbonate, polyurethane, acrylic, polyamide, poly(methyl methacrylate), co-polyester, cellulose triacetate, allyl diglycol carbonate, polyepisulfides, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, and any combination thereof.

In embodiments of the invention, the optical element can include two or more near infrared absorbers mixed in the optical substrate. In some aspects, the two or more near infrared absorbers can include polymethine, phthalocyanine, porphyrine, triphenylmethane, iminium, squarylium, croconium, dithiolene, quinone, polyperylene, pyrilium, thiopyrilium, cyanine, or any combination thereof. In some aspects, the optical element comprises about 10 to 2000 ppm of the two or more near infrared absorbers and all ranges and values there between including ranges of 10 to 20 ppm, 20 to 30 ppm, 30 to 40 ppm, 40 to 50 ppm, 50 to 60 ppm, 60 to 70 ppm, 70 to 80 ppm, 80 to 90 ppm, 90 to 100 ppm, 100 to 200 ppm, 200 to 300 ppm, 300 to 400 ppm, 400 to 500 ppm, 500 to 600 ppm, 600 to 700 ppm, 700 to 800 ppm, 800 to 900 ppm, 900 to 1000 ppm, 1000 to 1100 ppm, 1100 to 1200 ppm, 1200 to 1300 ppm, 1300 to 1400 ppm, 1400 to 1500 ppm, 1500 to 1600 ppm, 1600 to 1700 ppm, 1700 to 1800 ppm, 1800 to 1900 ppm, and 1900 to 2000 ppm.

In some instances, the two or more infrared absorbers may be substantially homogenously mixed in the optical substrate. In some instances, the two or more near infrared absorbers may be mixed with a higher concentration in the front portion and/or the back portion of the optical substrate than the middle portion of the optical substrate. In some aspects, the front portion may include about a third of the thickness of the optical substrate that is proximal to a front surface of the optical substrate. In some aspects, the back portion may include about a third of the thickness of the optical substrate that is proximal to a back surface of the optical substrate.

In some aspects, the two or more near infrared absorbers in the optical element are thermally stable to substantially avoid decomposition at a temperature range of 200 to 400° C. and all ranges and values there between including ranges of 200 to 210° C., 210 to 220° C., 220 to 230° C., 230 to 240° C., 240 to 250° C., 250 to 260° C., 260 to 270° C., 270 to 280° C., 280 to 290° C., 290 to 300° C., 300 to 310° C., 310 to 320° C., 320 to 330° C., 330 to 340° C., 340 to 350° C., 350 to 360° C., 360 to 370° C., 370 to 380° C., 380 to 390° C., and 390 to 400° C. In some aspects, the two or more near infrared absorbers have different near infrared cut ranges and/or different residual colors. In some aspects, the two or more near infrared absorbers in the optical element are adapted to generate a synergistic color intensity that is lower than individual color intensity of each of the two or more near infrared absorbers. In some instances, the synergistic color intensity of the two or more near infrared absorbers may be in a chroma range of 0 to 5 and all ranges and values there between including ranges of 0 to 0.5, 0.5 to 1, 1 to 1.5, 1.5 to 2, 2 to 2.5, 2.5 to 3, 3 to 3.5, 3.5 to 4, 4 to 4.5, and 4.5 to 5. In some instances, the two or more near infrared absorbers are synergistically neutral colored, or preferably achromatic.

In some aspects, the optical element may be capable of absorbing near infrared radiation of the wavelengths range of 780 to 2000 nm and all ranges and values there between including ranges of 780-820 nm, 820 to 860 nm, 860 to 900 nm, 900 to 940 nm, 940 to 980 nm, 980 to 1020 nm, 1020 to 1060 nm, 1060 to 1100 nm, 1100 to 1140 nm, 1140 to 1180 nm, 1180 to 1200 nm, 1200 to 1240 nm, 1240 to 1280 nm, 1280 to 1320 nm, 1320 to 1360 nm, 1360 to 1400 nm, 1400 to 1440 nm, 1440 to 1480 nm, 1480 to 1520 nm, 1520 to 1560 nm, 1560 to 1600 nm, 1600 to 1640 nm, 1640 to 1680 nm, 1680 to 1720 nm, 1720 to 1760 nm, 1760 to 1800 nm, 1800 to 1840 nm, 1840 to 1880 nm, 1880 to 1920 nm, 1920 to 1960 nm, 1960 to 2000 nm. In some aspects, the two or more near infrared absorbers in the optical element are adapted to generate a synergistic infrared cut range that is broader than individual infrared cut range of each of the two or more near infrared absorbers.

In some aspects, the two or more near infrared absorbers in the optical element are adapted to generate a synergistic infrared absorption level that is higher than individual near infrared absorption level of any of the two or more near infrared absorbers. In some aspects, the synergistic near infrared transmittance level for the two or more near infrared absorbers can be in a range of 5 to 80% (determined as $TsIR_{780-2000}$) and all ranges and values there between including ranges of 5 to 10%, 10 to 15%, 15 to 20%, 20 to 25%, 25 to 30%, 30 to 35%, 35 to 40%, 40 to 45%, 45 to 50%, 50 to 55%, 55 to 60%, 60 to 65%, 65 to 70%, 70 to 75%, and 75 to 80%. In some aspects, the two or more near infrared absorbers in the optical element are adapted to synergistically cause less than 10% reduction on the average optical transmittance in the 380 to 780 nm wavelength range (determined as Tv % (D65)) for the optical substrate including ranges of 0 to 1%, 1 to 2%, 2 to 3%, 3 to 4%, 4 to 5%, 5 to 6%, 6 to 7%, 7 to 8%, 8 to 9%, and 9 to 10%.

In some aspects, the optical element can include one or more functional films disposed on the front surface and/or back surface of the optical substrate. Non-limiting examples of the functional film include a polarized film, a photochromic film, a color film, a tintable film, a light filter film including a blue cut film, chrono cut film, and any combination thereof. In some instances, the functional films include a polarized film that has an average light transmittance level of less than about 50%. In some aspects, the polarized film may be prepared by forming a polarizing filter that comprises at least one of polyvinyl alcohol polarizing layer, polyacetylene polarizing layer, polyene polarizing layer, polyvinylene polarizing layer, polyethylene terephthalate (PET) polarizing layer, or wire-grid polarizing layer into a curve-shaped wafer. The polarized film may have a single layered structure or a multi-layered structure. In some instances, the polarized film may include one or more protective or functional layers. Non-limiting examples of the protective layer may include polycarbonate (PC) protective layer, cellulose acetate (CA), cellulos acetate butyrate (CAB), cellulose triacetate (TAC), polymethyl methacrylate (PMMA), polyamide (PA), PET, cyclic olefin copolymer (COC), cyclic olefin polymer (COP), and combinations thereof. Non-limiting examples of the functional layer may include a photochromic layer, a blue cut layer, a UV cut layer, a color enhancement layer, a tintable layer, a mirror layer, or any combination thereof. In some aspects, the polarized film may include a high transmission filter.

In some aspects, the optical element has a substantially homogenous color. In some aspects, the optical element has an average light transmittance level higher than 8%, preferably between 8 to 50% and all ranges and values there between including ranges of 8 to 11%, 11 to 14%, 14 to 17%, 17 to 20%, 20 to 23%, 23 to 26%, 26 to 29%, 29 to 32%, 32 to 35%, 35 to 38%, 38 to 41%, 41 to 44%, 44 to 47%, and 47 to 50%. In some aspects, the optical element has a delta E value between the center and edge thereof less than about 2, wherein the delta E represents color difference between the center and the edge of the optical element. Delta E value can be calculated using the CIE76 formula of $\Delta E^*_{ab} = \sqrt{(L^*_2-L^*_1)^2+(a^*_2-a^*_1)^2+(b^*_2-b^*_1)^2}$, where L, a, b are color scale defined in CIE publication 15.2 (1986), section 4.2 $L_1$, $a_1$ $b_1$ represents color scale at center, $L_2 a_2 b_2$ represents color scale at edge. More specifically, $L^*$ is the lightness value, represents the darkest black at $L^*=0$, and the brightest white at $L^*=100$; $a^*$ and $b^*$ are color channels, represent true neutral gray values at $a^*=0$ and $b^*=0$. The $a^*$ axis represents the green-red component, with green in the negative direction and red in the positive direction. The $b^*$ axis represents the blue-yellow component, with blue in the negative direction and yellow in the positive direction.

B. Method for Producing Optical Element Containing NIR Absorbers

Conventionally, methods for producing NIR absorbing optical element include mixing an near infrared absorber in an optical substrate precursor and produce the optical element using the mixture. Nevertheless, the process conditions for producing the optical element often include high temperatures at which the near infrared absorber is not thermally stable, resulting in loss of the near infrared absorbing ability for the produced optical element. Furthermore, the near infrared absorbers used in the conventional method can alter the color appearance of the optical element, which may negatively impact the aesthetic appearance of the optical element.

The methods disclosed herein are capable of avoiding these drawbacks of conventional methods. As shown in FIG. 1, embodiments include method 100 of preparing an optical element as described above, which is capable of absorbing near infrared radiation. In some aspects, the optical element may include an ophthalmic lens. In some instances, the optical element can be a sunglasses lens, or a colorless ophthalmic lens.

In some embodiments, as shown in block 101, method 100 may comprise providing a precursor material for the optical substrate and two or more of the near infrared absorbers. In some aspects, the precursor material can include a precursor for the optical substrate of polycarbonate, polyurethane, acrylic, polyamide, poly(methyl methacrylate), co-polyester, cellulose triacetate, allyl diglycol carbonate, polyepisulfides, trivex, polyacrylics, polyols, polyamines, polyanhydrides, polycarboxilic acids, polyepoxides, polyisocyanates, polynorbornenes, poly siloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, or any combination thereof. In some aspects, the two or more near infrared absorbers have different near infrared cut ranges and/or different residual colors. In some aspects, the two or more near infrared absorbers are selected from a group comprising polymethine, phthalocyanine, porphyrine, triphenylmethane, iminium, squarylium, croconium, dithiolene, quinone, polyperylene, pyrilium, thiopyrilium, cyanine, and combinations thereof.

In some embodiments, as shown in block 102, method 100 comprises determining a concentration for each of the two or more of the near infrared absorbers. In some aspects, the two or more near infrared absorbers at the concentrations determined at block 102 synergistically generates an infrared cut range that is broader than individual infrared cut range of each of the two or more near infrared absorbers and/or an infrared absorption level that is higher than individual infrared absorption range of each of the two or more near infrared absorbers. In some instances, the two or more near infrared absorbers include 10 to 2000 ppm of a first NIR absorber and 10 to 2000 ppm of a second NIR absorber. In some aspects, the two or more near infrared absorbers provided at block 102 are thermally stable at a temperature of 200 to 400° C. and all ranges and values there between including ranges of 200 to 210° C., 210 to 220° C., 220 to 230° C., 230 to 240° C., 240 to 250° C., 250 to 260° C., 260 to 270° C., 270 to 280° C., 280 to 290° C., 290 to 300° C., 300 to 310° C., 310 to 320° C., 320 to 330° C., 330 to 340° C., 340 to 350° C., 350 to 360° C., 360 to 370° C., 370 to 380° C., 380 to 390° C., and 390 to 400° C.

In some aspects, the determining at block 102 is performed by a trial-and-error method that includes producing a plurality of optical elements with various concentrations of the two or more near infrared absorbers, and selecting one or more combinations of the concentrations for the two or more near infrared absorbers based on one or more criteria. In some instances, the criteria may include one or more of a synergistic color of the two or more near infrared absorbers being neutral or colorless, a higher synergistic near infrared absorption level than individual near infrared absorption level of each infrared absorber, a broader synergistic near infrared cut range than individual near infrared cut range of each infrared absorber, a synergistic reduction on the average optical transmittance in the 380-780 nm wavelength range caused by the near infrared absorbers of less than 10%, and substantial color homogeneity of the produced optical elements that contain the near infrared absorbers.

In some embodiments, as shown in block 103, method 100 comprises mixing the precursor material and the two or more of the near infrared absorbers at the determined concentrations obtained at block 102 to form a mixture. In some aspects, the mixture can be substantially homogenous. In some embodiments, the mixing can be performed at a temperature in a range of 0 to 400° C. and all ranges and values there between including ranges of 0 to 20° C., 20 to 40° C., 40 to 60° C., 60 to 80° C., 80 to 100° C., 100 to 120° C., 120 to 140° C., 140 to 160° C., 160 to 180° C., 180 to 200° C., 200 to 220° C., 220 to 240° C., 240 to 260° C., 260 to 280° C., 280 to 300° C., 300 to 320° C., 320 to 340° C., 340 to 360° C., 360 to 380° C., and 380 to 400° C. In some aspects, mixing at block 103 may comprise optionally mixing a second amount of the precursor material with one or more of an ultraviolet dye, a monomer, a catalyst, a releasing agent, or any combination thereof to produce a first mixture.

In some embodiments, as shown in block 104, method 100 comprises producing the optical element that comprises the optical functional film disposed on the front surface and/or back surface thereof using the mixture obtained at block 103. In some aspects, the producing step can comprise forming the optical element via injection molding or casting under process conditions that has substantially no impact on the near infrared absorption levels of the two or more near infrared absorbers.

In some instances, the producing at block 104 include producing a polarized polycarbonate ophthalmic lens via injection molding. In some aspects, the injection molding process comprises placing a polarized film on an inner surface of a mold for injection molding, injecting the mixture comprising molten polycarbonate and the near infrared absorbers into the mold, and setting by cooling the mixture in the mold to produce the polarized polycarbonate lens. In some aspects, the mixture is injected into the mold at a temperature of 25 to 170° C. and all ranges and values there between including ranges of 25 to 40° C., 40 to 55° C., 55 to 70° C., 70 to 85° C., 85 to 100° C., 100 to 115° C., 115 to 130° C., 130 to 145° C., 145 to 160° C., and 160 to 170° C. In some aspects, method 100 may include cleaning the optical element produced at block 104.

Although embodiments of the present invention have been described with reference to blocks of FIG. 1, it should be appreciated that operation of the present invention is not limited to the particular blocks and/or the particular order of the blocks illustrated in FIG. 1. Accordingly, some embodiments may provide functionality as described herein using various blocks in a sequence different than that of FIG. 1.

As part of the disclosure of the present invention, specific examples are included below. The examples are for illustrative purposes only and are not intended to limit the invention. Those of ordinary skill in the art will readily recognize parameters that can be changed or modified to yield essentially the same results.

Example 1

Evaluation of Near Infrared Absorbers

Properties including NIR cut range, color properties, and thermal stability of two near infrared absorbers in polycarbonate ophthalmic lenses were evaluated. The near infrared absorbers tested are listed in Table 1.

TABLE 1

Near Infrared Absorbers Used for the Tests

| Dye Name | Dye code | λmax (nm) | Supplier |
| --- | --- | --- | --- |
| Epolight 9837 | NIR-11 | 1048 | Epolin |
| Epolight 3157 | NIR-13 | 886 | Epolin |

Each of Epolight™ 9837 (Epolin, USA) and Epolight™ 3157 (Epolin, USA) near infrared absorbers was mixed with PC pellets at a concentration of 50 ppm. The mixture was injection molded into 2 mm (thickness) plano lenses at three different injection molding temperatures including 515° F., (268.3° C.), 555° F., (290.5° C.), and 590° F., (310.0° C.). The near infrared cut range and level, thermal stability during the injection molding process, and lens light transmission spectrum were tested for each lens sample.

Figure 2A:
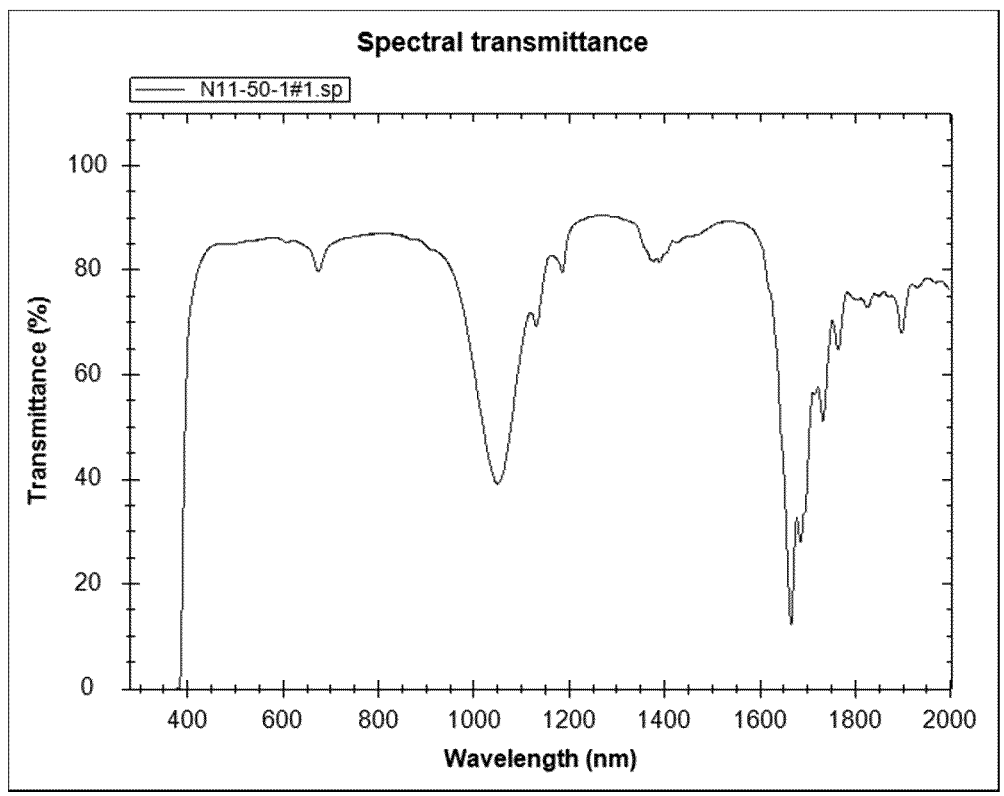
FIGS. 2A and 2B show plots of the spectral transmittance for the lenses containing Epolight™ 9837 near infrared absorber (FIG. 2A) and the lenses containing Epolight™ 3157 near infrared absorber.
Figure 2B:
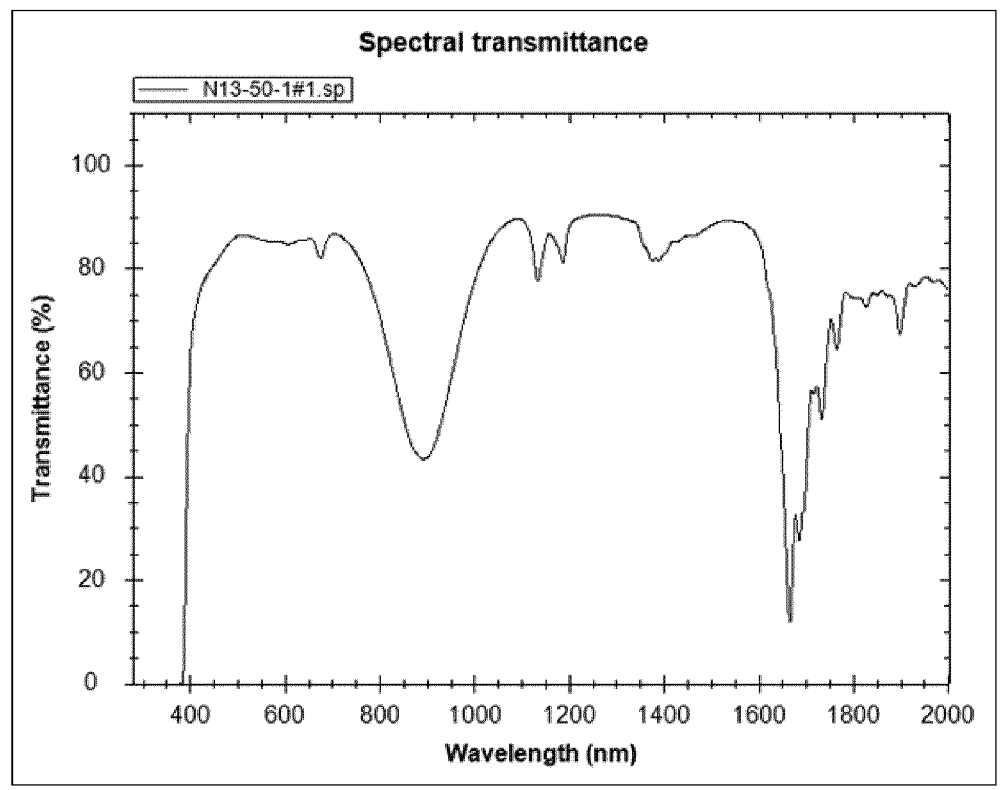

FIG. 2A shows the spectral transmittance of lenses containing Epolight™ 9837 near infrared absorber, and FIG. 2B shows the spectral transmittance of lenses containing Epolight™ 3157 near infrared absorber. The near infrared absorption level (NIR cut (%)) and residual color properties are summarized in Table 2.

TABLE 2

NIR Absorption and Visible Color Properties for Lenses with NIR Absorber

| Dye Name | Dye code | λmax (nm) | Tv D65 (%) | a* | b* | TsIR$_{780-2000}$ (%) | NIR cut (%) |
| --- | --- | --- | --- | --- | --- | --- | --- |
| Epolight 9837 | NIR-11 | 1048 | 85.3 | −0.8 | 1.8 | 76.2 | 23.8 |
| Epolight 3157 | NIR-13 | 886 | 85.0 | −2.4 | 3.9 | 71.2 | 28.8 |
| None (pure PC) | NA | NA | 89.3 | −.04 | 0.5 | 88.1 | 11.9 |

Figure 3A:
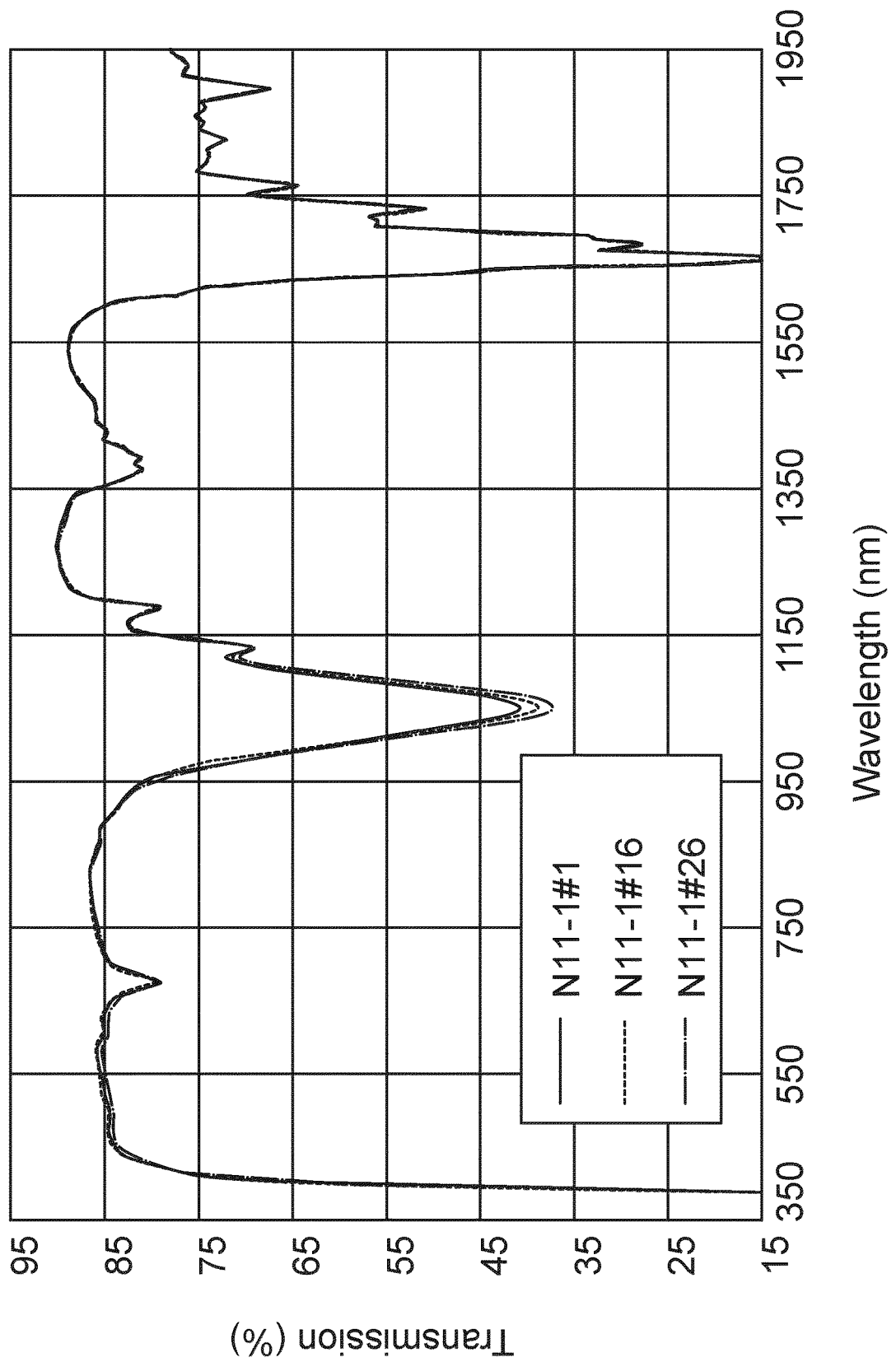
FIGS. 3A to 3C show plots of the spectral transmittance for the produced polycarbonate lenses with Epolight™ 9837 near infrared absorber injection molded at 515° F., (FIG. 3A), 555° F., (FIG. 3B), and 590° F., (FIG. 3C)
Figure 3B:
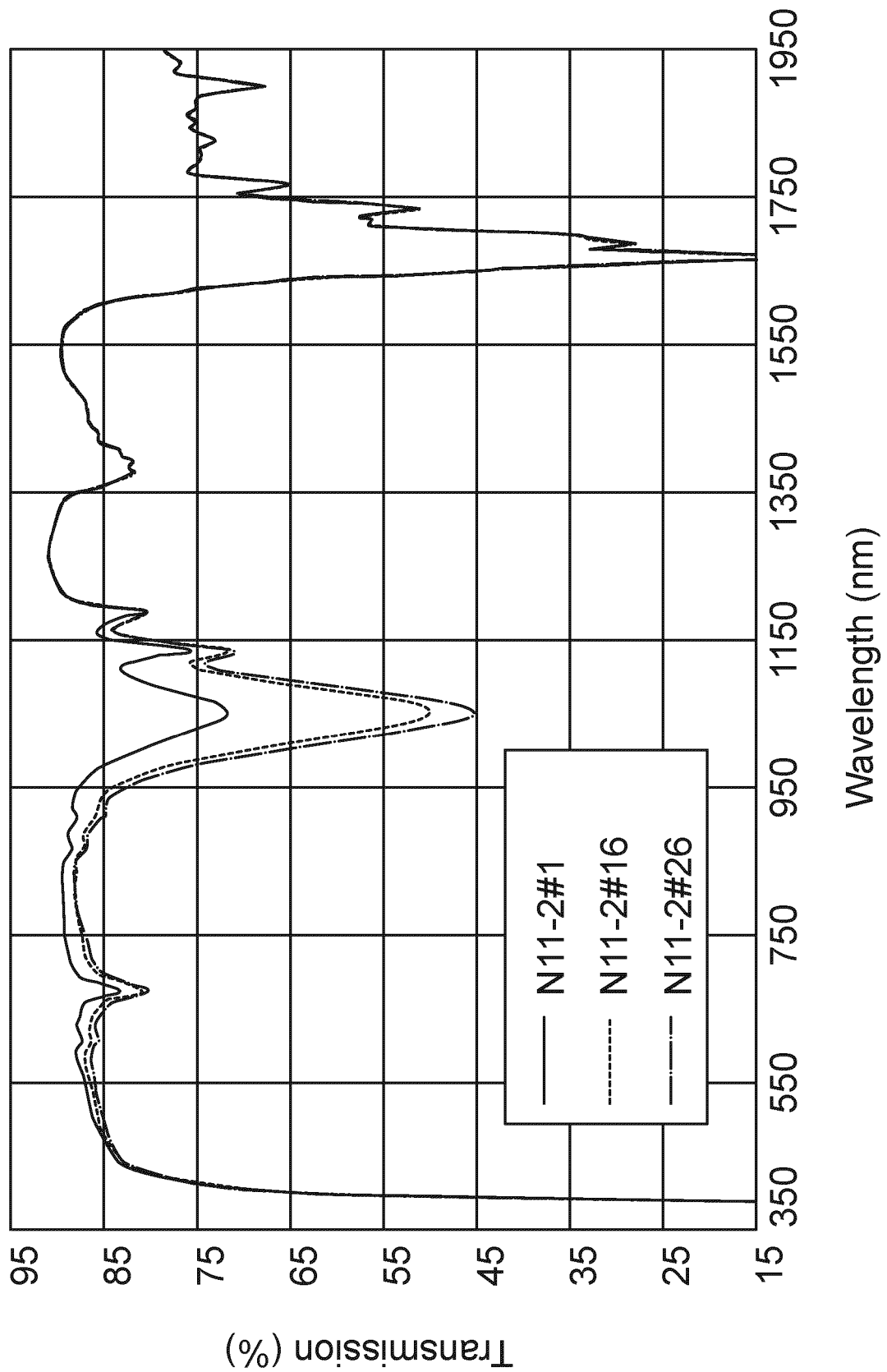
Figure 3C:
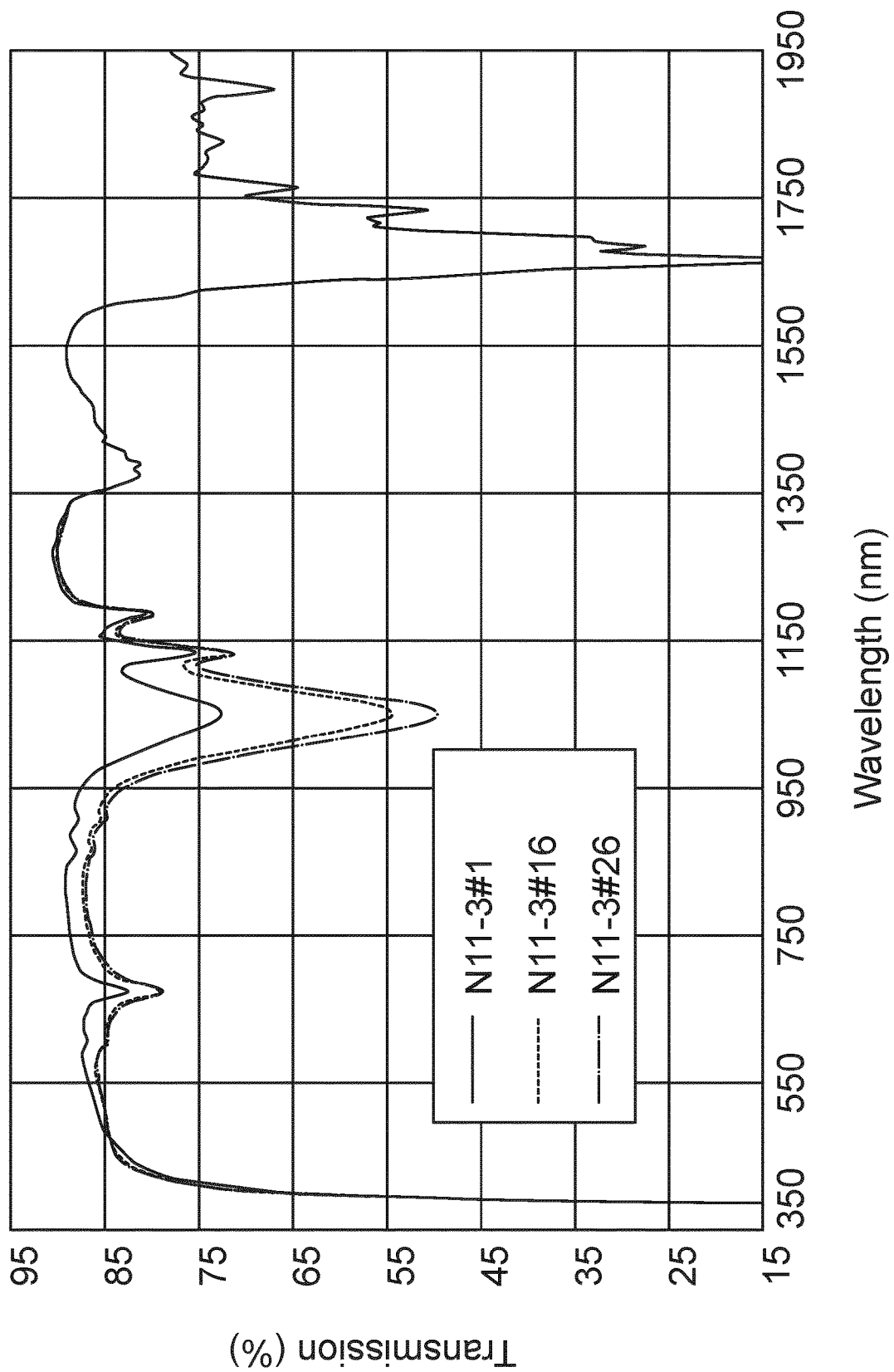
Figure 4A:
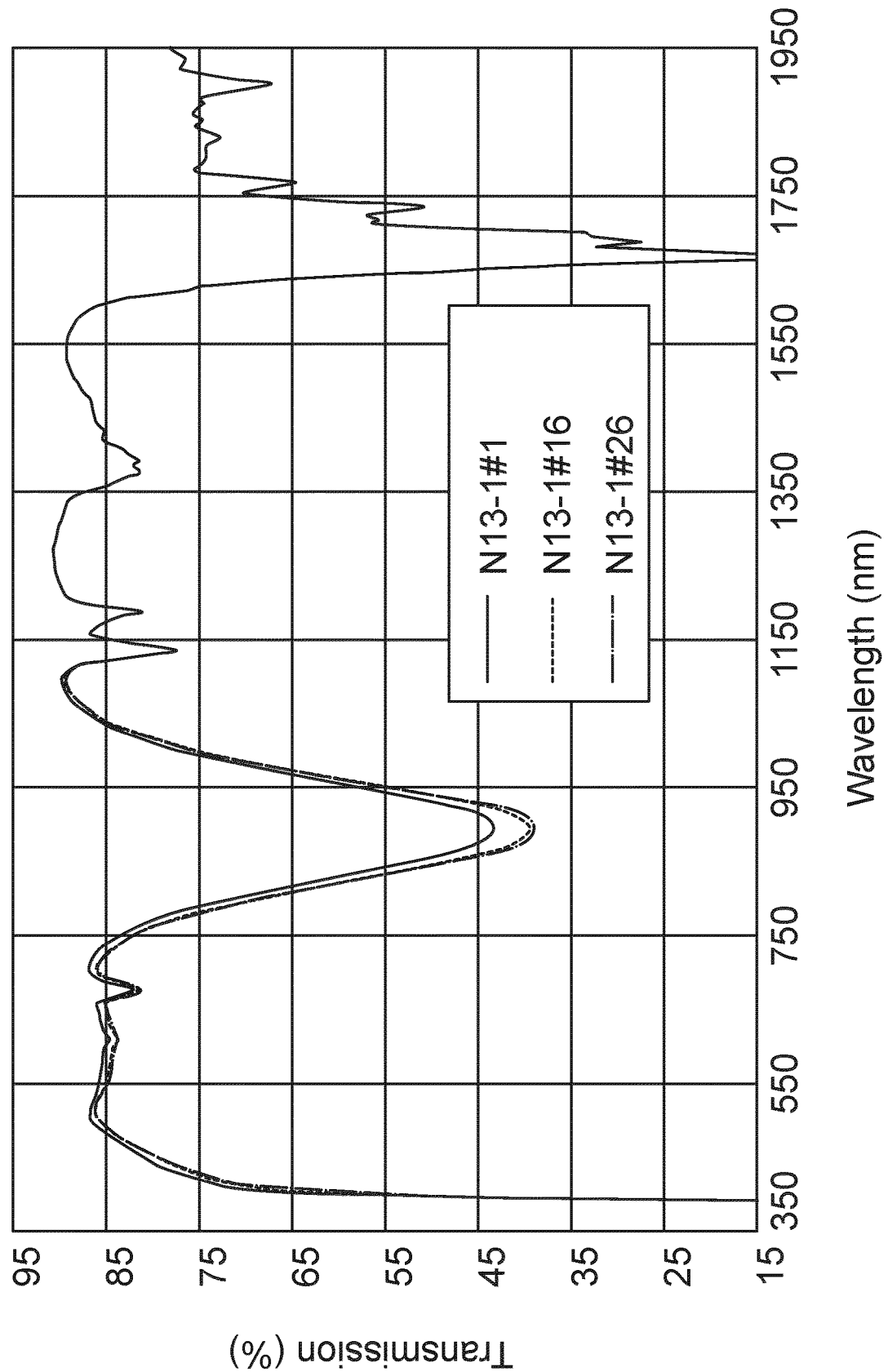
FIGS. 4A to 4C show plots of the spectral transmittance for the produced polycarbonate lenses with Epolight™ 3157 near infrared absorber injection molded at 515° F., (FIG. 4A), 555° F., (FIG. 4B), and 590° F., (FIG. 4C)
Figure 4B:
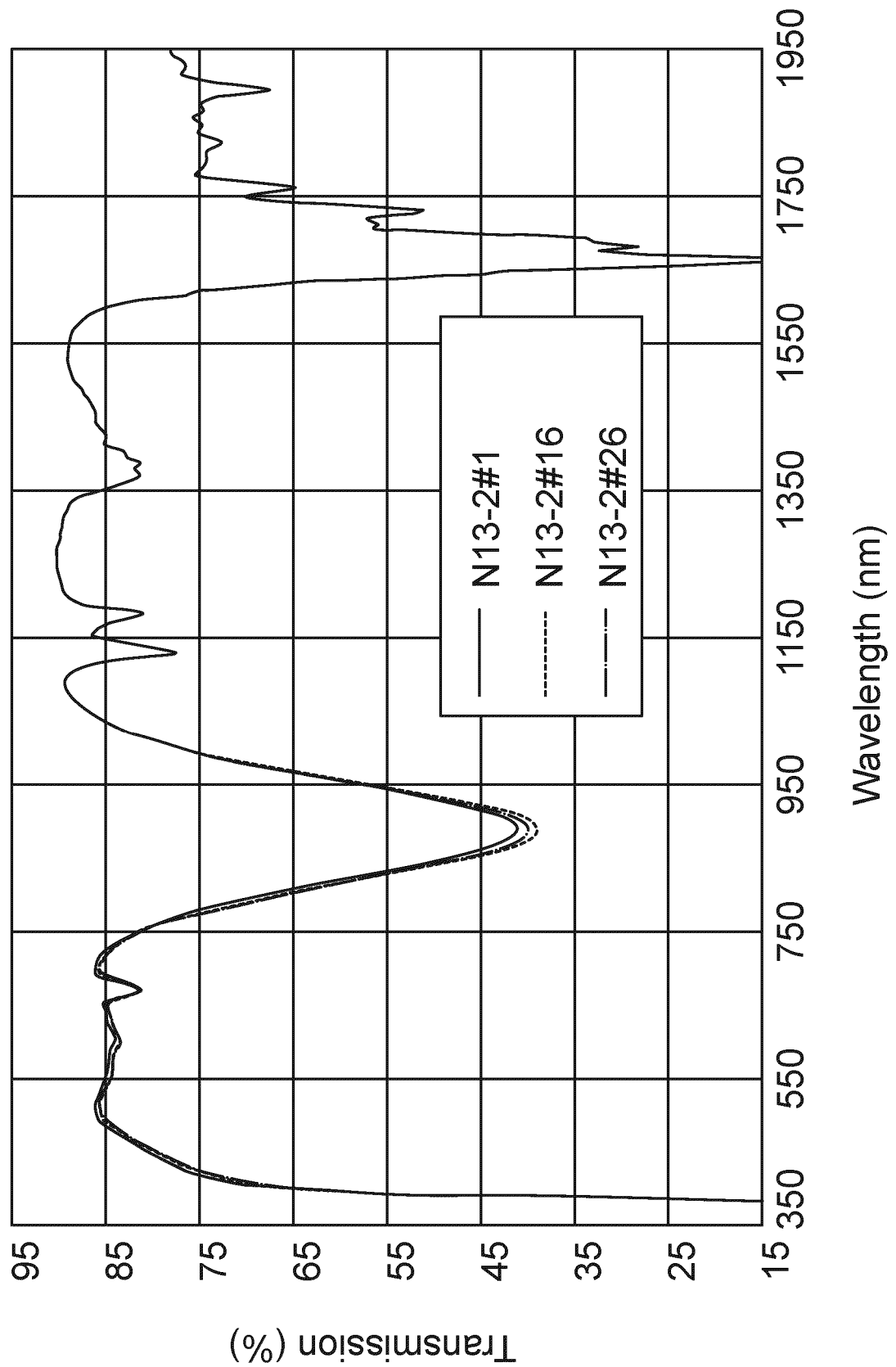
Figure 4C:
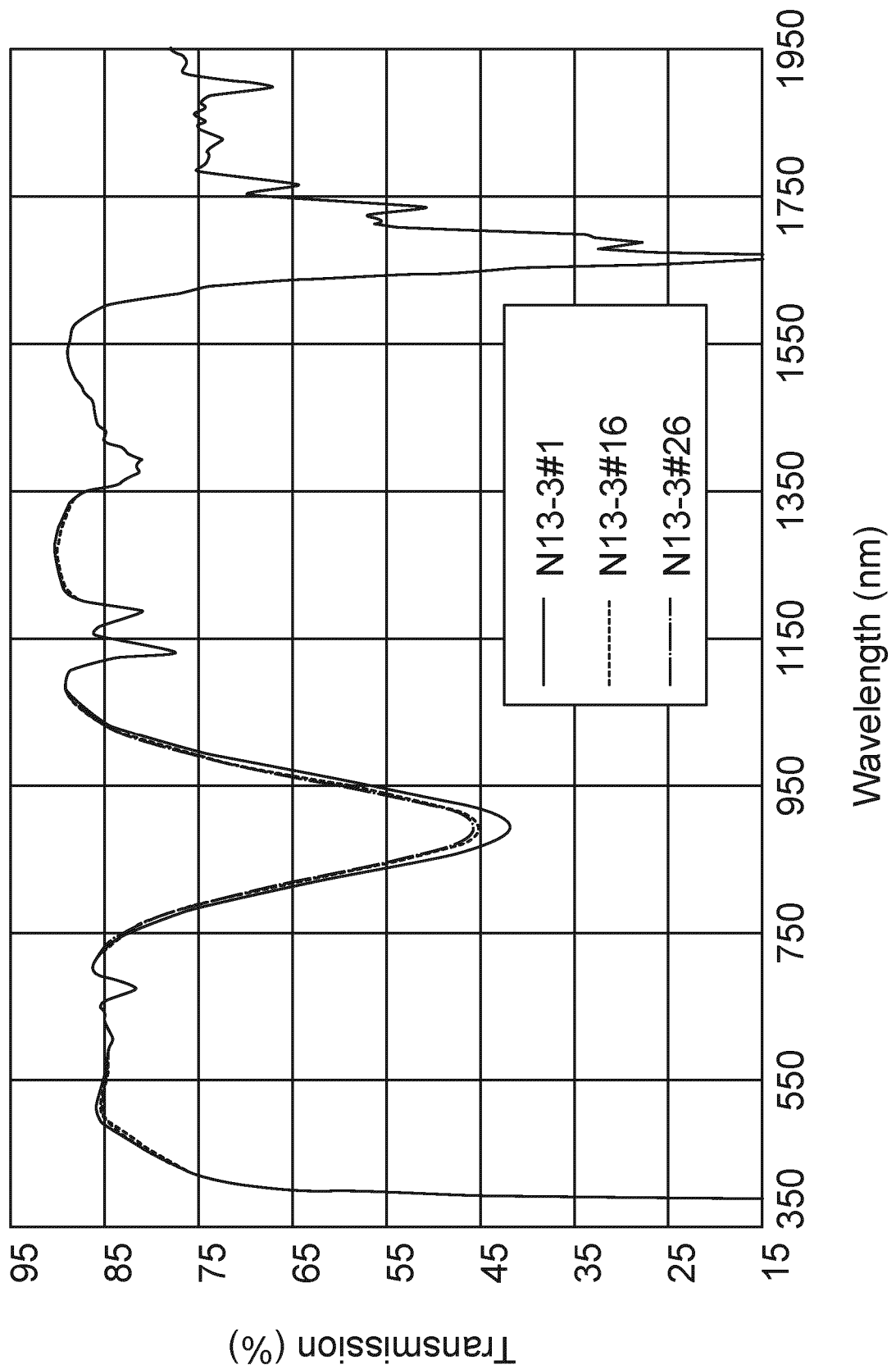

The results of the thermal stability of the near infrared absorbers are shown in FIGS. 3A-3C and FIGS. 4A-4C. FIG. 3A-3C show the light spectral transmittance of the produced polycarbonate lenses with Epolight™ 9837 that are injection molded at 515° F., (268.3° C.), 555° F., (290.5° C.), and 590° F., (310.0° C.), respectively. FIGS. 4A-4C show the light spectral transmittance of the produced polycarbonate lenses with Epolight™ 3157 that are injection molded at 515° F., (268.3° C.), 555° F., (290.5° C.), and 590° F., (310.0° C.), respectively. The results indicate that, for the Epolight™ 9837 absorber, the near infrared absorption level decreased and the near infrared absorption range widened as the injection molding temperature increased from 515° F. to 590° F. For the Epolight™ absorber, the near infrared absorption level had substantially no change in terms of near infrared absorption level and range as the injection molding temperature increased from 515° F. to 590° F. Therefore, Epolight™ 9837 is not thermally stable at 555° F. and 590° F., but stable at 515° F. Epolight™ 3157 is stable at all the three tested temperatures.

Example 2

Polarized Lenses with Multiple Near Infrared Absorbers

Polycarbonate based polarized lenses were produced using both Epolight™ 9837 and Epolight™ 3157 near infrared absorbers via injection molding. In each lens sample, the concentration for each of the near infrared absorbers was 100 ppm. Both standard (Std.) transmission polar wafer and high transmission (Hi-T) polar wafer were used. The mixture of polycarbonate pellets and the two near infrared absorbers for each sample were injection molded at 515° F., (268.3° C.). The polar wafer was disposed over the inner front (concave) surface of the mold during the injection molding process. The components for each set of lens samples are listed in Table 3.

TABLE 3

List of Components for Lens Samples

| Sample Set | Set #.1 | Set #.2 | Set #.C1 | Set #C2 | Set #C3 |
|---|---|---|---|---|---|
| Polar wafer | Std. Polar | Hi-T Polar | Std. Polar | Hi-T Polar | None |
| PC resin | PC/NIR mix | PC/NIR mix | PC clear | PC clear | PC/NIR mix |
| Base | 1.50B | 1.50B | 1.50B | 1.50B | 1.50B |
|  | 4.25B | 4.25B | 4.25B | 4.25B | 4.25B |
|  | 8.50B | 8.50B | 8.50B | 8.50B | 8.50B |

The infrared transmittance at 780 to 2000 nm range, $TsIR_{780-2000}$, for each lens sample was calculated using the equation of:

$$\tau_{SIR\,780-2000}(\%) = \frac{\int_{780}^{2000} \tau(\lambda).Es(\lambda).d\lambda}{\int_{780}^{2000} Es(\lambda).d\lambda}$$

Where $Es(\lambda)$ is solar spectral radiation defined in ISO 12312; NIR cut (%) is a value defined by $100-TsIR_{780-2000}$. The calculated visible transmittance with D65 source values (Tv D65) for each set of lens samples, and the difference ("Diff" in Table 5) for these values between lenses samples with and without near infrared absorbers are shown in Table 5.

TABLE 5

Lens NIR Absorption Properties

| Sample Set# | Sample name | Base | Power | CT | Tv D65 (%) | Sunwear Cat. | TsIR$_{780-2000}$ (%) | NIR cut (%) |
|---|---|---|---|---|---|---|---|---|
| Set #.1 | std. polar with NIR | 1.50 B | −7.00 | 1.5 mm | 17.8 | 2 | 49.6 | 50.4 |
| Set #.C1 | std. polar | 1.50 B | −7.00 | 1.3 mm | 18.2 | 2 | 79.2 | 20.8 |
| Diff |  |  |  |  | −0.5 |  |  | 29.6 |
| Set #.2 | high T polar with NIR | 1.50 B | −7.00 | 1.3 mm | 34.6 | 2 | 54.4 | 45.6 |
| Set #.C2 | high T polar | 1.50 B | −7.00 | 1.3 mm | 32.9 | 2 | 81.5 | 18.5 |
| Diff |  |  |  |  | 1.7 |  |  | 27.0 |
| Set #.1 | std polar with NIR | 4.25 B | 0.00 | 1.9 mm | 16.5 | 2 | 41.4 | 58.6 |
| Set #.C1 | std. polar | 4.25 B | 0.00 | 1.8 mm | 18.8 | 2 | 79.1 | 20.9 |
| Diff |  |  |  |  | −2.2 |  |  | 37.6 |
| Set #.2 | High T polar with NIR | 4.25 B | 0.00 | 1.9 mm | 32.4 | 2 | 43.3 | 56.7 |
| Set #.C2 | High T polar | 4.25 B | 0.00 | 1.9 mm | 36.4 | 2 | 80.6 | 19.4 |
| Diff |  |  |  |  | −4.0 |  |  | 37.2 |
| Set #.1 | std. Polar with NIR | 8.50 B | 6.00 | 6.5 mm | 10.5 | 3 | 20.8 | 79.2 |
| Set #.C1 | Std Polar | 8.50 B | 6.00 | 6.6 mm | 18.5 | 2 | 77.4 | 22.6 |
| Diff |  |  |  |  | −8.0 |  |  | 56.6 |
| Set #.2 | High T with NIR | 8.50 B | 6.00 | 6.3 mm | 19.9 | 2 | 21.0 | 79.0 |
| Set #.C2 | High T polar | 8.50 B | 6.00 | 6.6 mm | 35.1 | 2 | 77.0 | 23.0 |
| Diff |  |  |  |  | −15.2 |  |  | 56.0 |

TABLE 4

List of Power and Thickness for Each Lens Base

| Base | Power | Center thickness |
|---|---|---|
| 1.50B | −7.00 | 1.3 mm |
| 4.25B | 0.00 | 1.9 mm |
| 8.50B | 6.00 | 5.9 mm |

Figure 5A:
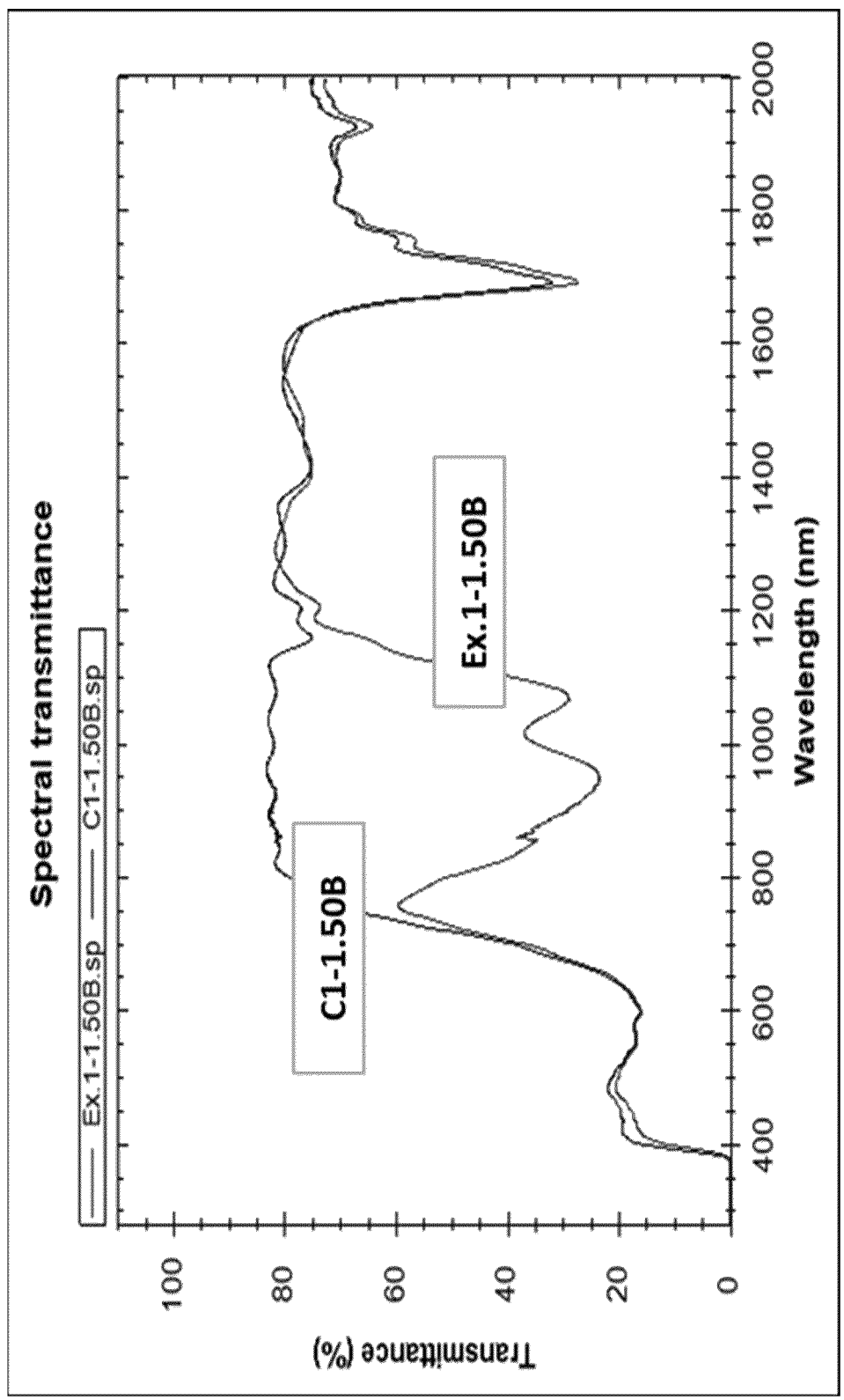
FIGS. 5A to 5C show plots of spectral transmittance for each lens configuration listed in Table 3 with lens bases of 1.50B (FIG. 5A), 4.25B (FIG. 5B), and 8.50B (FIG. 5C)
Figure 5B:
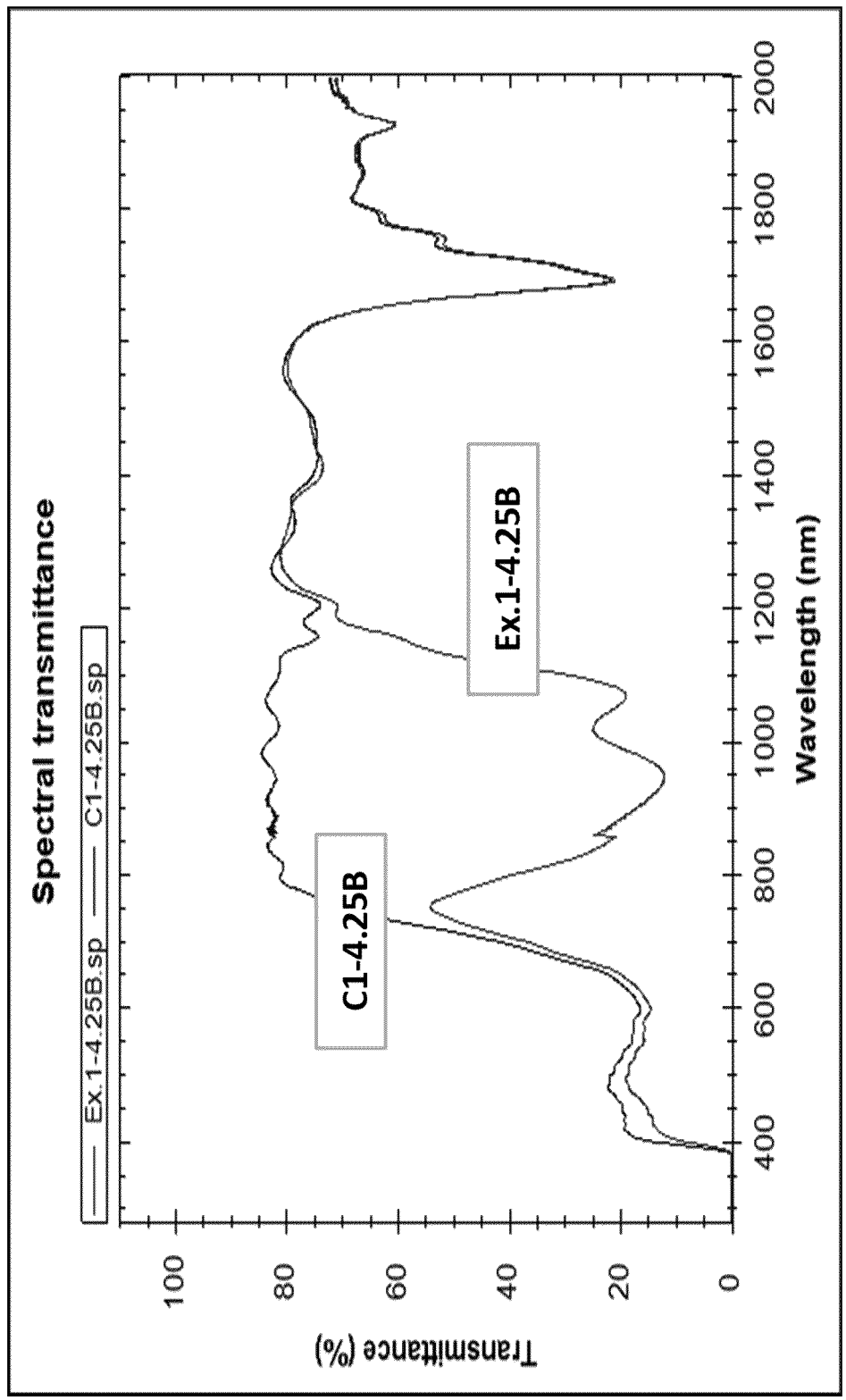
Figure 5C:
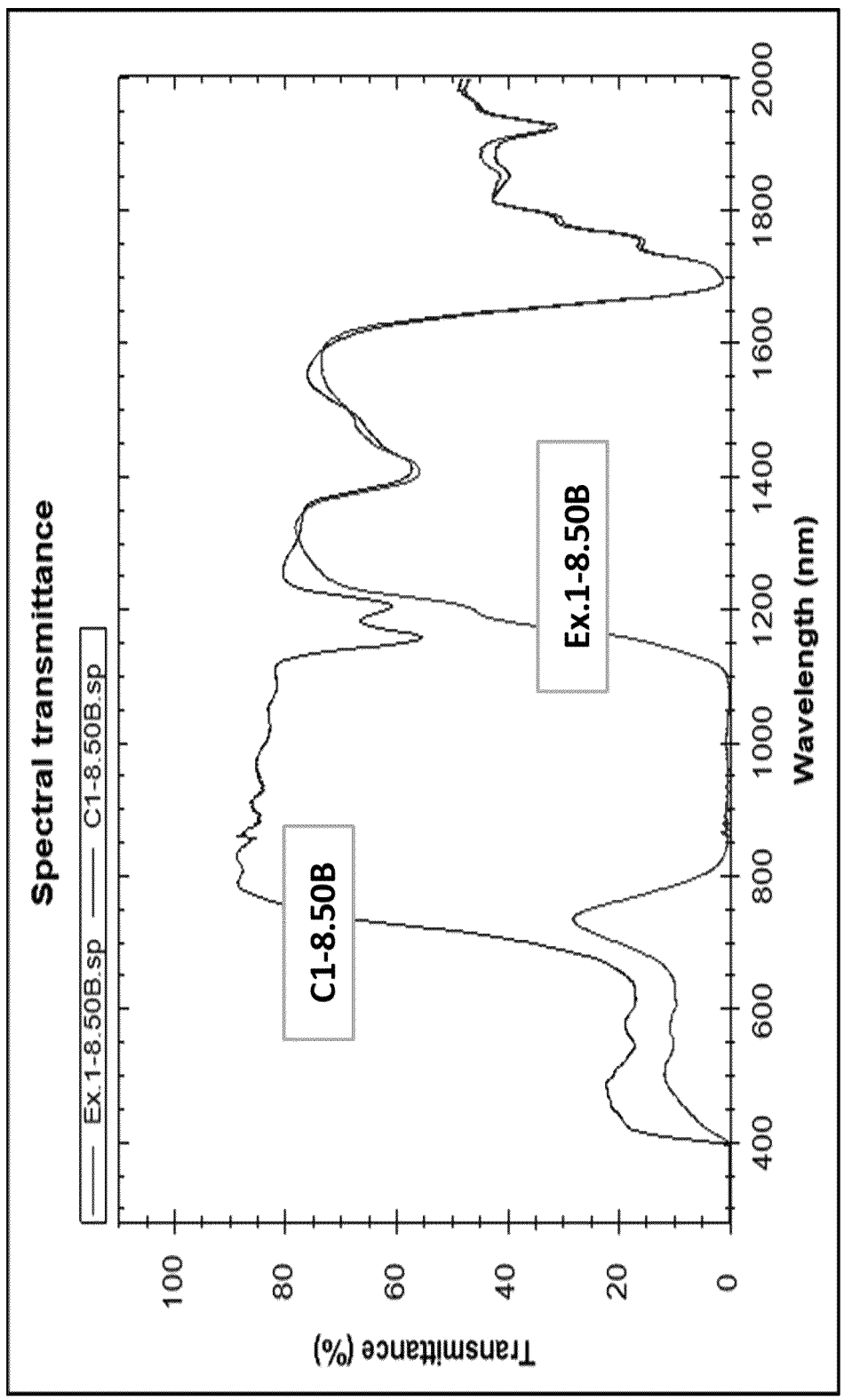

The light spectral transmittance for each sample was measured. The results are shown in FIGS. 5A to 5C for 1.50B, 4.25B, and 8.50B samples, respectively. The results indicate that all the samples with both near infrared absorbers have improved near infrared absorption ranges and higher near infrared absorption levels compared to samples without near infrared absorbers.

Figure 6A:
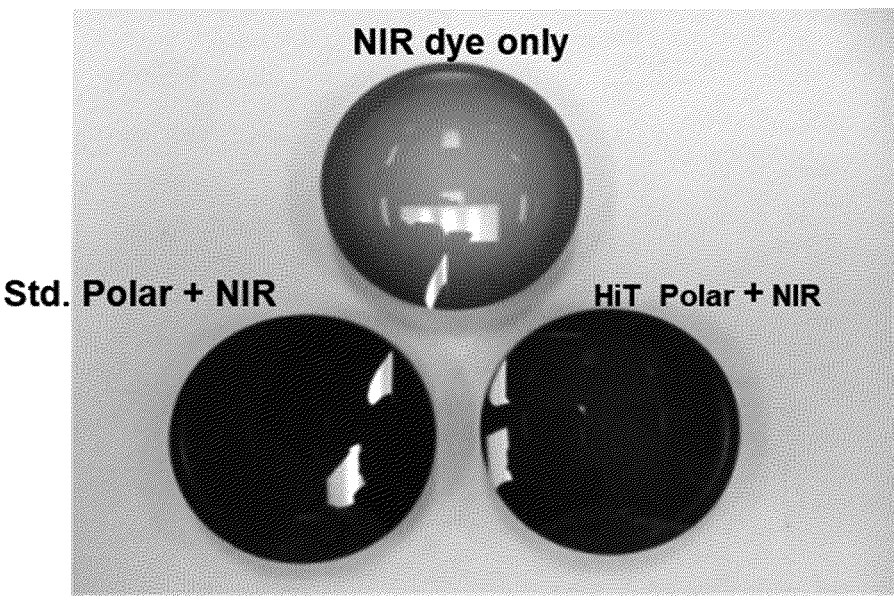
FIGS. 6A and 6B show picture of high transmittance polarized lens, standard polarized lens, and non-polarized lens, all of which containing Epolight™ 9837 and Epolight™ 3157 near infrared absorbers.
Figure 6B:
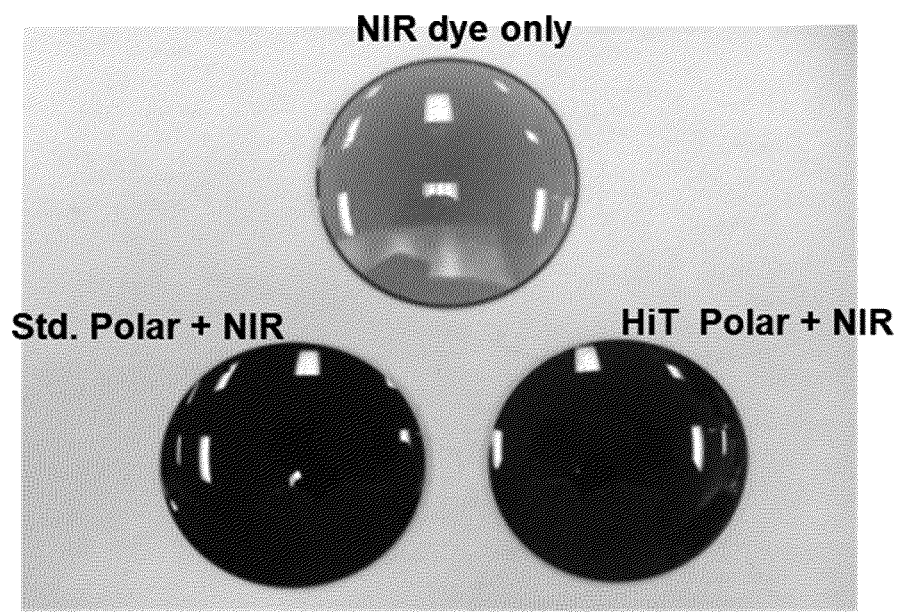

The results in Table 5 show that the near infrared absorbers in the polarized lens samples causes a slight decrease of total light transmission Tv (%), indicating the near infrared absorbers have minimal synergistic impact on wearer's visual perception. Table 5 further shows that lenses with both near infrared absorbers have significant increase on near infrared absorption level of the polarized lenses samples. Furthermore, as shown in FIGS. 6A and 6B, the selected near infrared absorbers (NIR dyes) were synergistically neutral colored with a low color intensity. The two near infrared absorbers do not significantly alter the color of the polarized lenses of −7.00 power with center thickness (CT) of 1.3 mm (FIG. 6A) and lenses of +4.00 power with center thickness (CT) of 6.5 mm (FIG. 6B).

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, treatment, machine, manufacture, composition of matter, means, methods, and/or steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. An optical element comprising:
   an optical substrate comprising a front surface and a back surface;
   two or more near infrared absorbers substantially homogeneously mixed in the optical substrate; and
   one or more functional films disposed on the front surface and/or back surface of the optical substrate;
   wherein the two or more near infrared absorbers have different near infrared cut ranges and/or different residual colors and are adapted to synergistically cause a less than 10% reduction in average optical transmittance in a wavelength range of 380-780 nm for the optical substrate;
   the one or more functional films comprise a polarized film having an average light transmittance level of less than about 50%;
   the optical element has a substantially homogeneous color and an average light transmittance level higher than about 8%.

2. The optical element of claim 1, wherein the optical element comprises an ophthalmic lens.

3. The optical element of claim 1, wherein the two or more near infrared absorbers in the optical element are adapted to generate a synergistic near infrared absorption level that is higher than individual near infrared absorption level of any of the two or more near infrared absorbers.

4. The optical element of claim 1, wherein the two or more near infrared absorbers in the optical element are adapted to generate a synergistic infrared cut range that is broader than individual infrared cut range of each of the two or more near infrared absorbers.

5. The optical element of claim 1, wherein the optical substrate comprises polycarbonate, polyurethane, acrylic, polyamide, poly (methyl methacrylate), co-polyester, cellulose triacetate, allyl diglycol carbonate, polyepisulfides, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, or any combination thereof.

6. The optical element of claim 1, wherein the two or more near infrared absorbers comprise polymethine, phthalocyanine, porphyrine, triphenylmethane, iminium, squarylium, croconium, dithiolene, quinone, polyperylene, pyrilium, thiopyrilium, cyanine, or any combination thereof.

7. The optical element of claim 1, wherein the optical element comprises 10 to 2000 ppm of the two or more near infrared absorbers.

8. The optical element of claim 1, wherein the optical element has a delta E value representing a color difference between the center and the edge in a range of less than about 2.

9. A method for preparing an optical element of claim 1, the method comprising:
   providing a precursor material for the optical substrate and two or more of the near infrared absorbers;
   determining a concentration for each of the two or more of the near infrared absorbers, at which the two or more near infrared absorbers synergistically generates an infrared absorption level that is higher than individual infrared absorption range of each of the two or more near infrared absorbers, wherein the two or more near infrared absorbers are adapted to synergistically cause a less than 10% reduction in average optical transmittance in a wavelength range of 380-780 nm for the optical substrate;
   mixing the precursor material and the two or more of the near infrared absorbers at the determined concentrations to form a substantially homogenous mixture; and
   producing the optical element that comprises the optical substrate and the one or more functional films disposed on the front surface and/or back surface thereof using the mixture.

10. The method of claim 9, wherein the producing step comprises forming the optical element via injection molding or casting under process conditions that has substantially no impact on the near infrared absorption levels of the two or more near infrared absorbers.

* * * * *